C. E. SANDS.
CAN OPENER.
APPLICATION FILED MAY 14, 1908.

903,008.

Patented Nov. 3, 1908.

WITNESSES
Samuel E. Wade.
C. E. Trainor

INVENTOR
CHARLES E. SANDS
BY Munn & Co.
ATTORNEYS

UNITED STATES PATENT OFFICE.

CHARLES E. SANDS, OF PALATKA, FLORIDA.

CAN-OPENER.

No. 903,008.  Specification of Letters Patent.  Patented Nov. 3, 1908.

Application filed May 14, 1908. Serial No. 432,897.

*To all whom it may concern:*

Be it known that I, CHARLES E. SANDS, a citizen of the United States, and a resident of Palatka, in the county of Putnam and State of Florida, have invented certain new and useful Improvements in Can-Openers, of which the following is a specification.

My invention is an improvement in can openers, and consists in certain novel constructions and combinations of parts hereinafter described and claimed.

Figure 1:
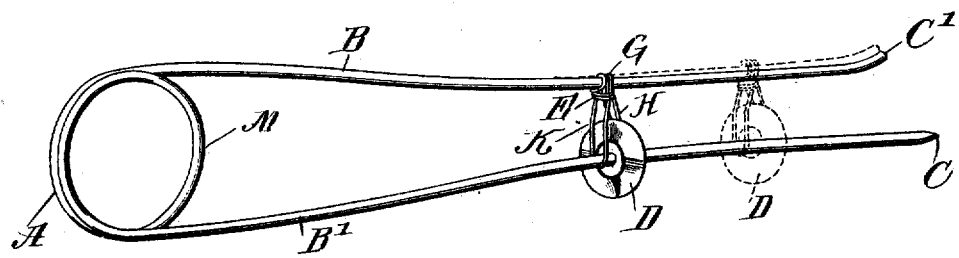
Figure 2:
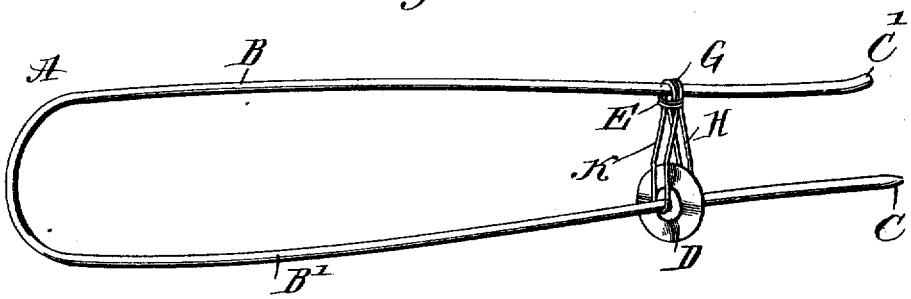
Figure 3:
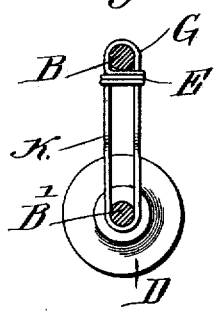
Figure 4:
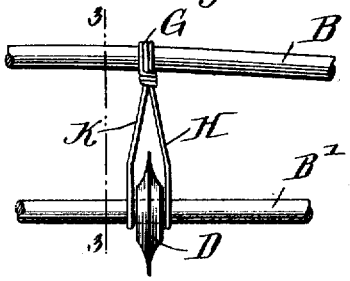

Referring to the drawings forming a part hereof Figure 1 is a perspective view of the improvement. Fig. 2 is a similar view of a modified form. Fig. 3 is a section on the line 3—3 of Fig. 4, and Fig. 4 is an enlarged detail side view of the cutter.

The present embodiment of the invention consists of a strand of spring wire A, bent upon itself to form a pair of parallel arms B, B'. One of the arms B, is of somewhat greater length than the other, and the free end of the longer arm is pointed as at C, and the free end of the short arm is bent slightly outward away from the longer arm as at C'.

A cutting wheel or disk D is journaled loosely on the longer arm, and the arms are connected by a wire E. The wire E is wrapped around the short arm as at G, and passes over the long arm in two loops H, K, one of the loops being arranged on each side of the cutting wheel, whereby to limit the longitudinal movement thereof with respect to the long arm.

In operation the pointed end of the long arm is inserted in the can top, at approximately the center thereof, and bent downwardly until the cutting wheel is in contact with the tin. The arm is now revolved around the edge of the top, the cutting wheel being held firmly in contact therewith, thus severing the center of the top from the margin.

The cutting wheel may be adjusted for different sized cans, by shoving the wire E toward or from the free ends of the arms, the said wire being arranged loosely enough to permit this movement.

If desired the bend of the wire may be formed into a coil as at M, whereby to provide a stronger spring between the arms.

It will be evident from the description, that my can opener is efficient, cheaply constructed and not liable to easily get out of order, being composed of few and simple parts.

I claim:

1. A can opener consisting of a strand of spring wire bent upon itself to form spaced arms, one of which is pointed and of greater length than the other, a cutting wheel loosely journaled on the longer arm, and a connection between the two bars, consisting of a wire looped over both arms, a loop being arranged upon each side of the wheel whereby to limit the longitudinal movement of the wheel with respect to the arm, said loops being displaceable longitudinally of the arms for the purpose set forth.

2. A can opener consisting of a strand of spring wire bent upon itself to form spaced arms, one of which is pointed, a cutting wheel journaled on the pointed arm, and a connection between the arms on each side of the cutting wheel whereby to limit the longitudinal movement thereof with respect to the arm, said connection being displaceable longitudinally of the arms, for the purpose set forth.

3. A can opener consisting of a strand of resilient material bent upon itself to form arms one of which is pointed, a cutting wheel journaled on the pointed arm, a displaceable connection between the arms, said connection embracing the wheel whereby to move the same when the carriage is moved.

CHARLES E. SANDS.

Witnesses:
 J. T. MINTON,
 N. H. MORAGNÉ.